US012122522B2

(12) United States Patent
Yagihashi et al.

(10) Patent No.: US 12,122,522 B2
(45) Date of Patent: Oct. 22, 2024

(54) FLYING OBJECT OPERATION DEVICE, MALFUNCTION PREVENTION METHOD FOR FLYING OBJECT OPERATION DEVICE, FLYING OBJECT THRUST GENERATION DEVICE, PARACHUTE OR PARAGLIDER DEPLOYING DEVICE, AND AIRBAG DEVICE

(71) Applicant: NIPPON KAYAKU KABUSHIKI KAISHA, Tokyo (JP)

(72) Inventors: Yasuhiko Yagihashi, Tokyo (JP); Hiroshi Nakamura, Tokyo (JP); Koichi Sasamoto, Tokyo (JP)

(*) Notice: Subject to any disclaimer, the term of this patent is extended or adjusted under 35 U.S.C. 154(b) by 840 days.

(21) Appl. No.: 16/981,298

(22) PCT Filed: Mar. 19, 2019

(86) PCT No.: PCT/JP2019/011614
§ 371 (c)(1),
(2) Date: Sep. 16, 2020

(87) PCT Pub. No.: WO2019/181989
PCT Pub. Date: Sep. 26, 2019

(65) Prior Publication Data
US 2021/0371114 A1 Dec. 2, 2021

(30) Foreign Application Priority Data
Mar. 20, 2018 (JP) .................. 2018-052761

(51) Int. Cl.
*B64D 17/72* (2006.01)
*B64U 10/13* (2023.01)
*B64U 70/83* (2023.01)

(52) U.S. Cl.
CPC ............ *B64D 17/725* (2013.01); *B64U 10/13* (2023.01); *B64U 70/83* (2023.01)

(58) Field of Classification Search
CPC ...... B64D 17/72; B64D 17/725; B64D 17/80; B64D 17/62; B64D 17/54; B64D 17/58; B64U 70/83
See application file for complete search history.

(56) References Cited

U.S. PATENT DOCUMENTS 9,145,212 B1 * 9/2015 Wei .................. B64D 17/00
11,286,053 B2 * 3/2022 Tsaliah .................. A62B 1/00
(Continued)

FOREIGN PATENT DOCUMENTS

| CN | 103895870 A | 7/2014 |
| JP | 9-61479 A | 3/1997 |

(Continued)

OTHER PUBLICATIONS

ESR; European Patent Office; Munich; Nov. 4, 2021.
ISR; Japan Patent Office; Tokyo, Japan; Jun. 18, 2019.

*Primary Examiner* — Philip J Bonzell
(74) *Attorney, Agent, or Firm* — Patshegen IP; Moshe Pinchas

(57) ABSTRACT

[Problem] Provided are a flying object operating device, a malfunction preventing method for a flying object operating device, a flying object thrust generating device, a parachute or paraglider deploying device, and an airbag device, each capable of improving reliability in terms of safety. A flying object igniter includes an ignition unit, an ignition abnormality detection unit which detects an operating state of the ignition unit, a flight state detection unit which detects a flight state of a flying object, an energizing circuit which has an energizing circuit switch for operating the ignition unit, and a calculation unit which compares a detection result obtained by the ignition abnormality detection unit and a detection result obtained by the flight state detection unit with respective thresholds set beforehand, and turns on the (Continued)

energizing circuit switch in accordance with the comparison result.

14 Claims, 14 Drawing Sheets

(56) References Cited

U.S. PATENT DOCUMENTS

| | | | | |
|---|---|---|---|---|
| 2016/0009392 A1* | 1/2016 | Korhonen | ............ | G05D 1/106 |
| | | | | 244/137.3 |
| 2016/0318615 A1* | 11/2016 | Pick | ............ | B64D 17/54 |
| 2016/0340049 A1* | 11/2016 | Ferreyra | ............ | H04L 67/12 |
| 2016/0347462 A1* | 12/2016 | Clark | ............ | G05D 1/0088 |
| 2017/0106986 A1* | 4/2017 | Sweeny | ............ | B64D 45/00 |
| 2017/0313433 A1 | 11/2017 | Ozaki | | |
| 2018/0065745 A1* | 3/2018 | Bash | ............ | B64D 31/06 |
| 2019/0039743 A1* | 2/2019 | Tanriover | ............ | E05B 81/08 |

FOREIGN PATENT DOCUMENTS

| | | |
|---|---|---|
| JP | 2004217059 A | 8/2004 |
| JP | 5985784 B2 | 9/2016 |

* cited by examiner

FLYING OBJECT OPERATION DEVICE, MALFUNCTION PREVENTION METHOD FOR FLYING OBJECT OPERATION DEVICE, FLYING OBJECT THRUST GENERATION DEVICE, PARACHUTE OR PARAGLIDER DEPLOYING DEVICE, AND AIRBAG DEVICE

TECHNICAL FIELD

The present invention relates to a flying object operating device included in a safety device mounted on a flying object, a malfunction preventing method for a flying object operating device, a flying object thrust generating device, a parachute or paraglider deploying device, and an airbag device.

BACKGROUND ART

In recent years, a flying object called a drone or the like, and including a plurality of rotors has been increasingly applied to industries with development of autonomous control technologies and flying control technologies. For example, a drone flies with simultaneous rotations of a plurality of rotors in a well-balanced manner. Ascending movement and descending movement are achieved by increasing or decreasing the rotation speed of the rotors, while forward movement and backward movement are achieved by increasing or decreasing the rotation speed of the rotors and thereby producing a tilt of an airframe. This type of flying object is expected to expand worldwide in the future.

Therefore, a risk of falling accidents of a flying object of the type described above has been worried. This risk may prohibit a spread of applications of the flying object. For reducing the risk of falling accidents, a parachute deploying device, an airbag device, and the like have been productized as safety devices. For example, Patent Literature 1 discloses an airbag device capable of assisting protection of an aerial vehicle, such as an unmanned aerial vehicle, when the aerial vehicle falls during flight.

CITATIONS LIST

Patent Literature

Patent Literature 1: Japanese Patent No. 5985784

SUMMARY OF INVENTION

Technical Problems

However, there is room for improving reliability of a flying object operating device, such as a flying object igniter, of conventional technologies including the patent literature identified above. Specifically, the conventional technology does not guarantee operations of a flying object operating device such as a flying object igniter, and therefore does not prevent malfunction of the flying object operating device such as an igniter.

Accordingly, an object of the present invention is to provide a flying object operating device, a malfunction preventing method for a flying object operating device, a flying object thrust generating device, a parachute or paraglider deploying device, and an airbag device, each capable of improving reliability in terms of safety.

Solutions to Problems (1) A flying object operating device according to the present invention is a flying object operating device included in a safety device mounted on a flying object, and includes: an operating unit provided to operate the safety device; an abnormality detection unit that detects an operating state of the operating unit; a flight state detection unit that detects a flight state of the flying object; an energizing circuit that includes an energizing circuit switch for operating the operating unit; and a calculation unit that compares a detection result obtained by the abnormality detection unit and a detection result obtained by the flight state detection unit with respective thresholds set beforehand, and turns on the energizing circuit switch based on a comparison result.

According to the configuration of (1) described above, the operation state of the operating unit is detected by the abnormality detection unit. Accordingly, whether or not the operating unit is normally operable is recognizable. In this case, the operation of the operating unit can be guaranteed. It is therefore avoidable to activate a system of the safety device without checking whether or not the operating unit is operable. Furthermore, the calculation unit compares the detection result obtained by the abnormality detection unit and the detection result obtained by the flight state detection unit with respective thresholds, and performs control for turning on the energizing circuit switch based on a comparison result. More specifically, the energizing circuit switch is configured to be turned on when the flying object is determined to be in the flying state with the operation of the operating unit guaranteed. Accordingly, the operating unit does not operate by mistake, wherefore malfunction of the operating unit is avoidable. In this manner, reliability in terms of safety can improve.

(2) In the flying object operating device according to (1) described above, the operating unit may include: a locking unit configured to lock a cover configured to close an opening of a housing that includes the safety device with the housing; a driving unit configured to drive the locking unit to release the locking of the locking unit; and a moving unit configured to move the cover from the opening of the housing when the locking of the locking unit is released.

According to the configuration (2) described above, the operating unit having a simple configuration and applicable to operation of the safety device can be provided without using an igniter.

(3) In the flying object operating device according to (1) described above in another aspect, the operating unit may be an ignition type ignition unit using an explosive.

According to the configuration of (3) described above, the operation state of the ignition unit is detected by the abnormality detection unit. Accordingly, whether or not the ignition unit is normally operable is recognizable. In this manner, the operation of the ignition unit can be guaranteed. It is therefore avoidable to activate the safety device without checking whether or not the ignition unit is operable. Furthermore, the calculation unit compares the detection result obtained by the abnormality detection unit and the detection result obtained by the flight state detection unit with respective thresholds, and performs control for turning on the energizing circuit switch based on a comparison result. More specifically, the energizing circuit switch is configured to be turned on when the flying object is determined to be in the flying state with the operation of the ignition unit guaranteed. Accordingly, the ignition unit does not operate by mistake, wherefore malfunction of the ignition unit is avoidable. In this manner, reliability in terms of safety can improve.

(4) It is preferable that the flying object operating device according to (3) described above further includes a diagnosis unit that issues a notification that an abnormality has been detected at activation of the safety device based on at least either the detection result obtained by the abnormality detection unit or the detection result obtained by the flight state detection unit.

According to the configuration of (4) described above, the diagnosis unit notifies an administrator or the like that an abnormality has been detected when the abnormality detection unit detects an abnormality in the operating unit, or when the flight state detection unit detects an abnormality in the flight state of the flying object. Accordingly, the administrator or the like can easily and immediately recognize the abnormality.

(5) In the flying object operating device according to (3) or (4) described above, the abnormality detection unit may be a resistance detection device that supplies to the ignition unit a weak current having a lower current value than a current value during normal operation, and detects a resistance value of the ignition unit.

According to the configuration of (5) described above, an abnormality in the ignition unit can be easily detected by a simple configuration.

Note that the flight state detection unit may acquire information associated with the flight state based on a camera, an acceleration sensor, a gyro sensor, a pressure sensor, a laser sensor, an ultrasonic sensor, a vibration sensor capable of detecting a vibration of a propelling device of an unmanned aerial vehicle, a voltage sensor detecting a voltage of a power supply unit of an unmanned aerial vehicle, and a wireless signal from GNSS (Global Navigation Satellite System) or an administrator.

(6) In the flying object operating device according to (1) to (5) described above, the flight state detection unit may acquire information associated with the flight state from a flight control unit of the flying object.

According to the configuration of (6) described above, the flight state is detectable by acquiring information associated with the flight state in real time from a flight control unit usually included in the flying object.

(7) The present invention is a malfunction preventing method for a flying object operating device included in a safety device mounted on a flying object. The flying object operating device includes an operating unit used for operating the safety device. The method includes: a first detection step that detects an operating state of the operating unit; a second detection step that detects a flight state of the flying object; an activating step that activates the safety device based on a detection result obtained by the first detection step and a detection result obtained by the second detection step; and a deactivating step that periodically recognizes the flight state, and deactivates the safety device when the flying object is not in the flight state.

According to the method of (7) described above, the operation state of the operating unit such as an ignition unit is detected. Accordingly, whether or not the operating unit is normally operable is recognizable. In this case, the operation of the operating unit can be guaranteed. It is therefore avoidable to activate a system of the safety device without checking whether or not the operating unit is operable. Moreover, the control for activating the safety device is performed based on the detection result associated with the operating unit and the detection result associated with the flight state. More specifically, the safety device is brought into an activated state when the flying object is determined to be in the flying state with the operation of the operating unit guaranteed. Accordingly, malfunction of the operating unit is avoidable. Furthermore, the flight state is periodically recognized, and the safety device is brought into a deactivated state when the current state is not the flight state (for example, when the flying object lands). In these points, malfunction of the operating unit can be similarly prevented in a reliable manner. In this manner, reliability in terms of safety can improve.

(8) The present invention is a malfunction preventing method for a flying object operating device included in a safety device mounted on a flying object. The flying object operating device includes an operating unit provided to operate the safety device. The method includes: a first detection step that detects an operating state of the ignition unit; a second detection step that detects a flight state of the flying object; an energizing step that turns on an energizing circuit switch connected to the ignition unit based on a detection result obtained by the first detection step and a detection result obtained by the second detection step; and a non-energizing step that periodically recognizes the flight state, and turns off the energizing circuit switch when the flying object is not in the flight state.

According to the method of (8) described above, the operation state of the operating unit such as an ignition unit is detected. Accordingly, whether or not the operating unit is normally operable is recognizable. In this case, the operation of the operating unit can be guaranteed. It is therefore avoidable to activate a system of the safety device without checking whether or not the operating unit is operable. Moreover, the control for turning on the energizing circuit switch is performed based on the detection result associated with the operating unit and the detection result associated with the flight state. More specifically, the energizing circuit switch is turned on when the flying object is determined to be in the flying state with the operation of the operating unit guaranteed. Accordingly, malfunction of the operating unit is avoidable. Furthermore, the flight state is periodically recognized, and the energizing circuit switch is turned off when the current state is not the flight state (for example, when the flying object lands). In these points, malfunction of the operating unit can be similarly prevented in a reliable manner. In this manner, reliability in terms of safety can improve.

(9) The present invention is a flying object thrust generating device connected to a flying object. The flying object thrust generating device includes: a housing; one or a plurality of the flying object operating devices according to (1) to (6) described above and provided inside the housing or outside the housing; and a power source to which the flying object operating device is connected.

According to the configuration of (9) described above, the flying object operating device presented in (1) to (6) described above is provided. In this case, the operation of the operating unit such as an ignition unit can be guaranteed, and malfunction of the operating unit can be prevented similarly to the above. In this manner, reliability in terms of safety can improve.

(10) The present invention in a further aspect is a flying object thrust generating device connected to a flying object. The flying object thrust generating device may include: a housing; one or a plurality of the flying object operating devices according to (3) or (5) described above and provided inside the housing; a power source to which the flying object operating device is connected; and a propellant that is at least one of propellants selected from an explosive, a gas generating agent, a flammable liquid, and a flammable solid, and is provided inside the housing.

According to the configuration of (10) described above, a sufficient gas pressure generated by the ignition operation of the flying object igniter (for example, gas pressure for inflating the airbag of the safety device or the like) can be secured by providing the propellant.

(11) In the flying object thrust generating device of (10) described above, it is preferable that the flying object operating device is disposed on a bottom side of the housing, and that the flying object thrust generating device further includes a sealing cover disposed on a side opposite to a position of the flying object operating device, and closing an opening of the housing.

According to the configuration of (11) described above, the sealing cover prevents exposure of the propellant and the flying object operating device provided in the housing to the outside of the housing at a normal time.

(12) A parachute or paraglider deploying device according to the present invention includes: the flying object operating device according to (1) to (6) described above; an abnormality detection unit that detects an abnormality of the flying object; and a parachute or a paraglider that is deployable. The operating unit of the flying object operating device is activated to deploy the parachute or the paraglider when the abnormality is detected by the abnormality detection unit.

According to the configuration of (12) described above, the flying object operating device presented in (1) to (6) described above is provided. In this case, the operation of the operating unit such as an ignition unit can be guaranteed, and malfunction of the operating unit can be prevented similarly to the above. Accordingly, reliability of the parachute or paraglider deploying device in terms of safety can improve.

(13) It is preferable that the parachute or paraglider deploying device of (12) described above further include: a component detection unit that detects a presence or absence or an abnormality of the parachute or the paraglider; and a notification unit that issues a notification indicating the absence or the abnormality of the parachute or the paraglider when the component detection unit detects the absence or the abnormality of the parachute or the paraglider.

According to the configuration of (13) described above, the notification unit notifies the administrator or the like that an abnormality or the like has been detected when the component detection unit (for example, an optical sensor) detects the abnormality or the like of the parachute or the paraglider. Accordingly, the administrator or the like can easily and immediately recognize the abnormality.

(14) An airbag device according to the present invention includes: an airbag that is inflatable; the flying object operating device according to (3) or (5) described above; a gas generator that generates gas for inflating the airbag by an ignition operation performed by the flying object operating device; and an abnormality detection unit that detects an abnormality of the flying object. The airbag is inflated by the gas generated by the gas generator with ignition of the ignition unit of the flying object operating device at the time of detection of the abnormality by the abnormality detection unit.

According to the configuration of (14) described above, the flying object operating device presented in (3) or (5) described above is provided. In this case, the operation of the ignition unit can be guaranteed, and malfunction of the ignition unit can be prevented similarly to the above. Accordingly, reliability of the airbag device in terms of safety can improve.

(15) It is preferable that the airbag device according to (14) described above further include: a component detection unit that detects a presence or absence or an abnormality of the airbag; and a notification unit that issues a notification indicating the absence or the abnormality of the airbag when the component detection unit detects the absence or the abnormality of the airbag.

According to the configuration of (15) described above, the notification unit notifies the administrator or the like that an abnormality or the like has been detected when the component detection unit (for example, an optical sensor) detects the abnormality or the like of the airbag. Accordingly, the administrator or the like can easily and immediately recognize the abnormality.

Advantageous Effects of Invention

Providable according to the present invention are a flying object operating device, a malfunction preventing method for a flying object operating device, a flying object thrust generating device, a parachute or paraglider deploying device, and an airbag device, each capable of improving reliability in terms of safety.

DESCRIPTION OF EMBODIMENT

Described hereinafter with reference to the drawings will be a flying object thrust generating device including a flying object igniter which is an example of a flying object operating device according to an embodiment of the present invention.

Figure 1:
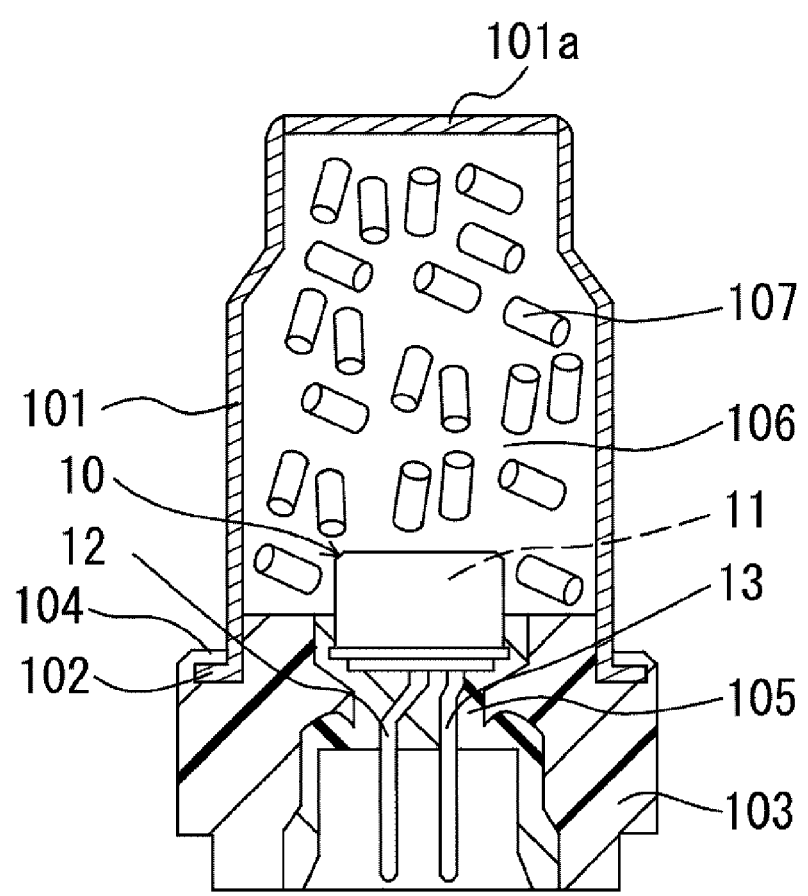
FIG. 1 is a cross-sectional view showing a flying object igniter according to an embodiment of the present invention.

As shown in FIG. 1, a flying object igniter 10 of the present embodiment is applied to a flying object thrust generating device for operating a safety device mounted on a flying object such as a drone, for example. Specifically, the flying object igniter 10 is applied to a flying object thrust generating device for operating a safety device such as a deploying device which deploys a parachute, a paraglider, or the like using gas pressure generated by an ignition operation, an airbag device which inflates an airbag using this gas pressure, or the like.

Figure 2:
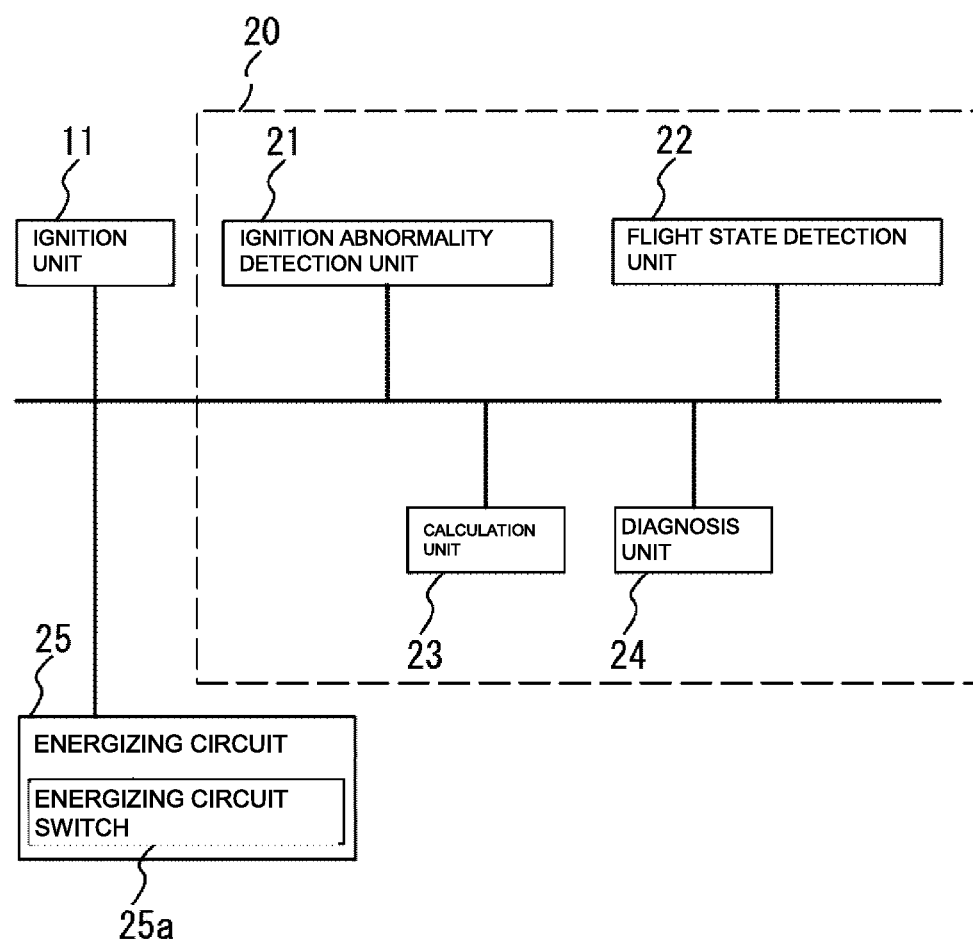
FIG. 2 is a block diagram showing a functional configuration of the flying object igniter.

As shown in FIG. 1, a flying object thrust generating device 100 includes the flying object igniter 10 (for convenience, some parts associated with FIG. 2 are not shown in FIG. 1), a housing 101 including a flange portion 102 on an opening side, a holder 103 having a fastening portion 104 for fastening the flange portion 102, and a holder 105 recessed toward the inside of the holder 103 and holding terminal pins 12 and 13 of the flying object igniter 10. Lower ends of the terminal pins 12 and 13 are connected to a power source (not shown).

The housing 101 includes a gas generating agent storage chamber (combustion chamber) 106 which stores a gas generating agent 107 inside. The housing 101 is fixed to the holder 103 by fastening the flange portion 102 using the fastening portion 104 in a state where the gas generating agent storage chamber 106 faces an ignition unit 11 inside the flying object igniter 10. A sealing cover 101a constituted by a fragile member is provided in an upper part of the housing 101 (that is, on the side opposite to the flying object igniter 10). For example, the housing 101 is constituted by a metal member made of stainless steel, steel, aluminum alloy, stainless alloy, or the like. Note that the housing 101 is a bottomed columnar member integrally molded. However, the housing 101 is not limited to this example. The columnar member forming the housing and the sealing cover may be separate members, and the sealing cover may be fixed to one end of the columnar member in such a manner as to close the one end of the columnar member. In addition, instead of the gas generating agent 107, other propellants appropriately selected from an ignition charge, a flammable liquid, a flammable solid, and the like may be adopted in accordance with use purposes.

The ignition unit 11 includes a bridge wire (not shown) bridged between the upper ends of the terminal pins 12 and 13, and one or a plurality of ignition powder layers (not shown) covering the bridge wire.

When a predetermined amount of current is supplied to the terminal pins 12 and 13 in this configuration, the ignition powder layer is ignited by heat generation of the bridge wire. As a result, the gas generating agent 107 is ignited and burned by a flame generated in the ignition powder layer, and generates a large amount of gas. This gas breaks and opens the sealing cover 101a of the housing 101, and flows out of the housing 101. The gas having flowed out is utilized to eject an ejection body included in a parachute or paraglider deploying device and connected to a parachute or a paraglider, or utilized to inflate an airbag included in an airbag device.

Next, a functional configuration of the flying object igniter 10 will be described. As shown in FIG. 2, the flying object igniter 10 includes a control unit (a computer having a CPU, a ROM, a RAM, and the like) 20, and an energizing circuit 25.

The control unit 20 has a functional configuration including an ignition abnormality detection unit 21, a flight state detection unit 22, a calculation unit 23, and a diagnosis unit 24. The ignition abnormality detection unit 21, the flight state detection unit 22, the calculation unit 23, and the diagnosis unit 24 described above are functionally implemented under a predetermined program executed by the control unit 20. The energizing circuit 25 also includes an energizing circuit switch 25a for activating (igniting) the ignition unit 11. The energizing circuit switch 25a may be a switch which electrically performs a switching operation, or may be a physical switch which achieves physical energization and de-energization (for example, a switch similar to a safety box performing explosive ignition).

The ignition abnormality detection unit 21 detects an operating state of the ignition unit 11. That is, the ignition abnormality detection unit 21 detects whether or not the ignition unit 11 is operable. Specifically, in the present embodiment, the ignition abnormality detection unit 21 is a resistance detection device which supplies to the ignition unit 11 a weak current whose current value is lower than a current value during normal operation, and detects a resistance value of the ignition unit 11 to detect whether or not the ignition unit 11 is operable.

The flight state detection unit 22 detects a flight state of the flying object. In this case, the flight state detection unit 22 may acquire information associated with the flight state (for example, a speed, an acceleration, an inclination, an altitude, a position, and the like of the flying object) from a flight control unit of the flying object (for example, a flying object computer included in the flying object and having a CPU, a ROM, a RAM, and the like), and detect the flight state of the flying object based on the information.

The calculation unit 23 compares a detection result obtained by the ignition abnormality detection unit 21 and a detection result obtained by the flight state detection unit 22 with respective thresholds set beforehand, and turns on the energizing circuit switch 25a based on a comparison result. Specifically, the calculation unit 23 turns on the energizing circuit switch 25a when determinations that an abnormality is absent in the ignition unit 11, and that the flying object is in the flight state are made by the ignition abnormality detection unit 21 and the flight state detection unit 22, respectively. Moreover, the calculation unit 23 is capable of turning off the energizing circuit switch 25a according to the flight state of the flying object (for example, when the flying object is not in the flying state).

At the time of activation of the safety device, the diagnosis unit 24 notifies an administrator or the like, for example, that an abnormality has been detected based on at least either the detection result of the ignition abnormality detection unit 21 or the detection result of the flight state detection unit 22. For example, this notification by the diagnosis unit 24 may be a visual notification by illumination mounted on the flying object or an audio notification by a sound device, or a notification by a wireless signal transmitted to a management center or the like.

Next, a flow of an operation of the flying object igniter 10 of the present embodiment will be described with reference to a flowchart.

Figure 3:
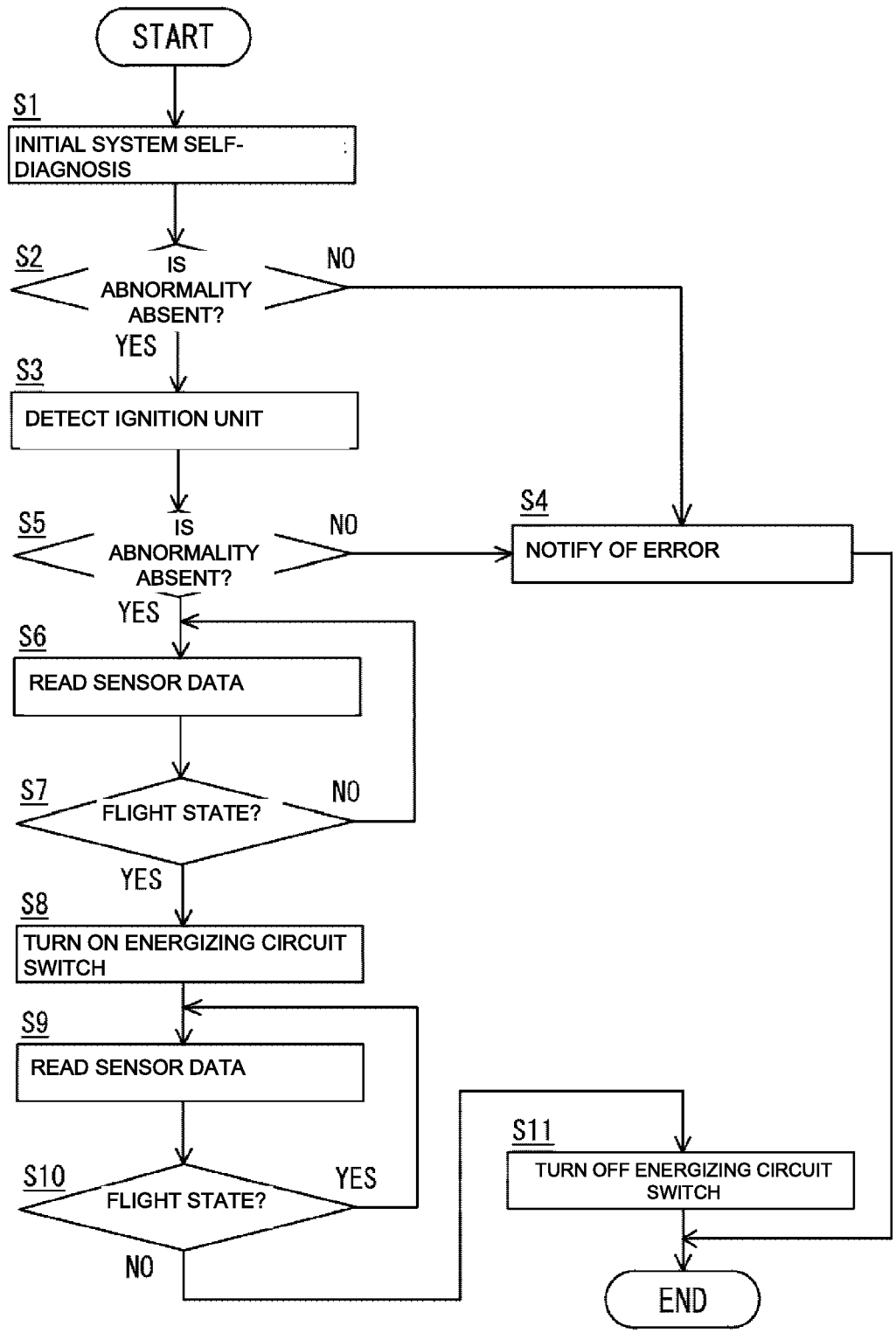
FIG. 3 is a flowchart showing an operation of the flying object igniter.

As shown in FIG. 3, system self-diagnosis is initially performed by the CPU of the flying object igniter 10 (step S1). In this case, whether or not a normal operation is achievable is diagnosed using an acceleration sensor or the like which measures an acceleration of the flying object.

When the absence of abnormality is determined as a result of step S1 (YES in step S2), whether or not the ignition unit 11 is operable is detected by the above-described method using the ignition abnormality detection unit 21 (step S3). On the other hand, when the absence of abnormality is not determined as a result of step S1 (NO in step S2), the diagnosis unit 24 notifies the administrator or the like of an error (step S4) to end the process.

When an abnormality is absent in the ignition unit 11 (YES in step S5) after step S3, the flight state detection unit 22 reads actual measurement data from the acceleration sensor or the like (step S6). On the other hand, when an abnormality is present in the ignition unit 11 (NO in step S5), the diagnosis unit 24 notifies the administrator or the like of an error (step S4) to end the process.

When the flying object is in the flight state (YES in step S7) after step S6, the calculation unit 23 turns on the energizing circuit switch 25a (step S8). On the other hand, when the flying object is not in the flight state (NO in step S7), the flight state detection unit 22 returns to the processing of step S6. Note that the diagnosis unit 24 may notify the administrator or the like of an error before returning to the processing of step S6 when the flight state detection unit 22 detects an abnormality in the flight state of the flying object.

After step S8, the flight state detection unit 22 again continues reading the actual measurement data from the acceleration sensor (step S9). Subsequently, when the flying object is not in the flight state (NO in step S10), the calculation unit 23 turns off the energizing circuit switch 25a (step S11). On the other hand, when the flying object is in the flight state (YES in step S10), the flight state detection unit 22 returns to the processing of step S9.

As described above, according to the present embodiment, the operation state of the ignition unit 11 is detected by the ignition abnormality detection unit 21. Accordingly, whether or not the ignition unit 11 is normally operable is recognizable. In this manner, the operation of the ignition unit 11 can be guaranteed. It is therefore avoidable to activate a system of the safety device without checking whether or not the ignition unit 11 is operable. Furthermore, the calculation unit 23 compares the detection result obtained by the ignition abnormality detection unit 21 and the detection result obtained by the flight state detection unit 22 with the respective thresholds, and performs control for turning on the energizing circuit switch 25a based on a comparison result. More specifically, the energizing circuit switch 25a is configured to be turned on when the flying object is determined to be in the flying state with the operation of the ignition unit 11 guaranteed. Accordingly, malfunction of the ignition unit 11 is avoidable. In the manner described above, reliability of the flying object igniter 10 in terms of safety can improve.

Moreover, according to this embodiment, the diagnosis unit 24 notifies the administrator or the like that an abnormality has been detected when the ignition abnormality detection unit 21 detects an abnormality in the ignition unit 11, or when the flight state detection unit 22 detects an abnormality in the flight state of the flying object. Accordingly, the administrator or the like can easily and immediately recognize the abnormality.

In addition, according to the present embodiment, the ignition abnormality detection unit 21 is constituted by a resistance detection device which supplies to the ignition unit 11 a weak current having a current value lower than a current value during normal operation, and detects a resistance value of the ignition unit 11. Accordingly, an abnormality of the ignition unit 11 is easily detectable by a simple configuration.

Described next will be an example of a parachute or paraglider deploying device to which the flying object igniter 10 of the present embodiment is applied. The parachute or paraglider deploying device includes a pyro-actuator which propels a piston by gas pressure generated in accordance with an ignition operation of the flying object igniter 10.

For example, the parachute or paraglider deploying device may adopt such a configuration which includes an actuator (pyroactuator) and a parachute or a paraglider in a housing having one opened end, and directly pushes out the parachute or the paraglider by a propelling force of the piston of the actuator to deploy the parachute or the paraglider. Followings are specific examples.

Figure 4:
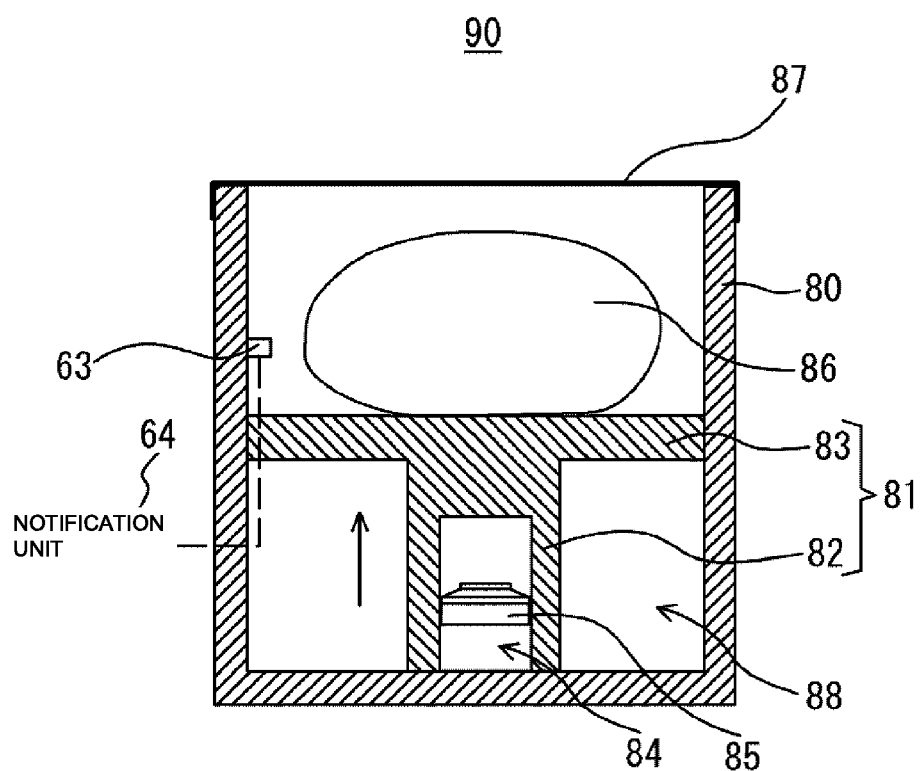
FIG. 4 is a cross-sectional view showing a parachute or paraglider deploying device including the flying object igniter.

As shown in FIG. 4, a parachute or paraglider deploying device 90 includes an actuator 88 and a parachute or paraglider 86. The actuator 88 includes a flying object igniter 84 which is similar to the flying object igniter 10 described above and has a cup-shaped case 85 storing an ignition charge (not shown), a piston 81 having a recess 82 and a piston head 83 formed integrally with the recess 82, and a housing 80 having a bottomed cylindrical shape, housing the piston 81, and regulating a propelling direction of the piston 81. The parachute or paraglider 86 is housed in the housing 80 while disposed on the piston head 83, and constitutes a so-called parachute. In this configuration, the parachute or paraglider 86 can be directly pushed out and deployed in accordance with propelling by the piston 81. Note that the open end of the housing 80 is closed by a cover 87 in an initial state. The cover 87 is separated from the open end by being pushed by the parachute or paraglider 86.

In this configuration, the piston 81 is propelled by gas pressure generated by the ignition operation of the flying object igniter 84 when an abnormality is detected by an abnormality detection unit (not shown) such as an acceleration sensor. In this manner, the parachute or paraglider 86 can be directly pushed out and deployed by the propelling force of the piston 81.

The parachute or paraglider deploying device 90 further includes a component detection unit 63 which detects the presence or absence and abnormality of the parachute or paraglider 86, and a notification unit 64 which notifies the administrator or the like of the absence or abnormality of the parachute or paraglider 86 when the component detection unit 63 detects the absence or abnormality of the parachute or paraglider 86. For example, the component detection unit 63 is constituted by an optical sensor.

Figure 5:
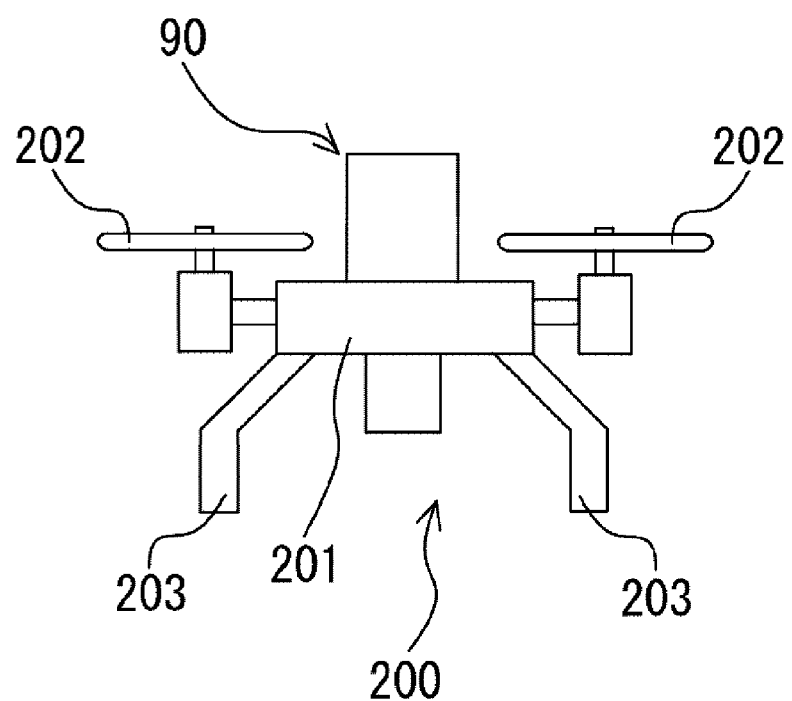
FIG. 5 is a diagram showing an example of a flying object to which the parachute or paraglider deploying device of FIG. 4 is applied.

FIG. 5 is a diagram showing an example of a flying object to which the parachute or paraglider deploying device 90 of FIG. 4 is applied. As shown in FIG. 5, a flying object 200 includes an airframe 201, one or more propelling mechanisms (for example, propellers) 202 which are coupled to the airframe 201 to propel the airframe 201, a plurality of legs 203 provided on a lower part of the airframe 201, and a flight control unit (not shown). The parachute or paraglider deploying device 90 is provided on the airframe 201.

As described above, the parachute or paraglider deploying device 90 includes the flying object igniter 84. In this case, the operation of the ignition unit 11 can be guaranteed, and malfunction of the ignition unit 11 can be prevented similarly to the above. Accordingly, reliability of the parachute or paraglider deploying device 90 in terms of safety can improve.

Furthermore, when the component detection unit 63 detects an abnormality or the like of the parachute or the paraglider 86, the notification unit 64 notifies the administrator or the like that the abnormality or the like has been detected. Accordingly, the administrator or the like can easily and immediately recognize the abnormality.

Figure 6:
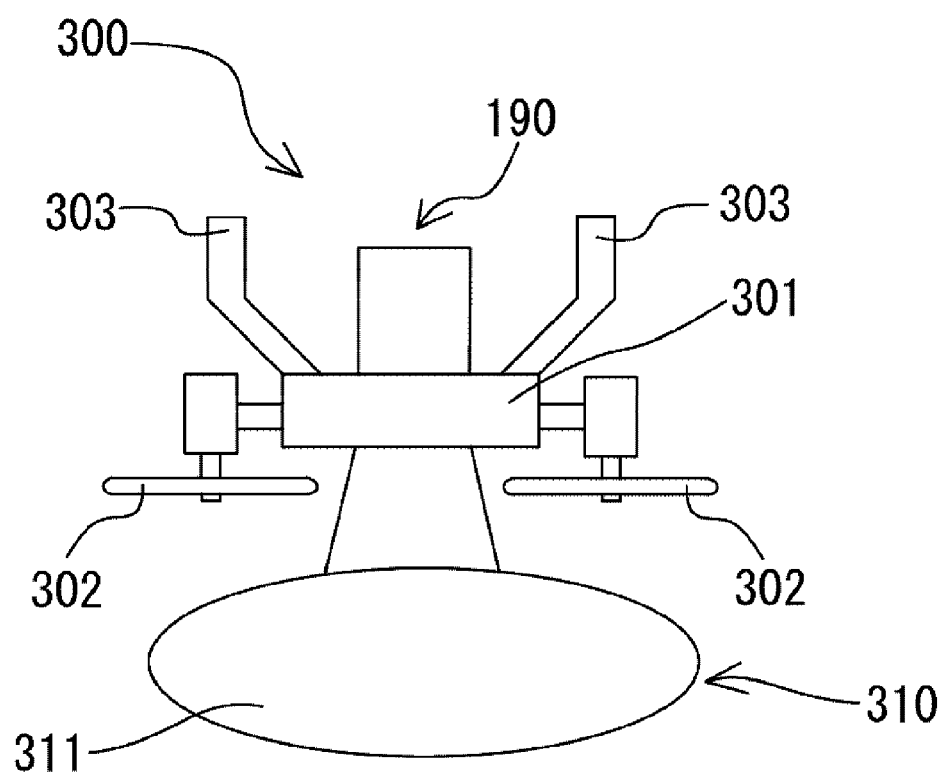
FIG. 6 is a diagram showing an example of a flying object including an airbag device to which the flying object igniter is applied.

Described next will be flying objects 300 and 400 each including an airbag device to which the flying object igniter of the present embodiment is applied. Note that parts in FIG. 6 referred to below and given last two digits identical to corresponding digits in FIG. 5 are similar to the corresponding parts described in FIG. 5 unless specified otherwise. Accordingly, description of these parts is not repeated. Similarly, parts in FIG. 7 referred to below and given last two digits identical to corresponding digits in FIGS. 5 and 6 are similar to the corresponding parts described in FIGS. 5 and 6 unless specified otherwise. Accordingly, description of these parts is not repeated.

As shown in FIG. 6, the flying object 300 includes an airbag device 310 which inflates an airbag 311 by gas pressure generated by an ignition operation of a flying object igniter similar to the flying object igniter 10 described above. The airbag device 310 is provided on an airframe 301 facing a parachute or paraglider deploying device 190 provided on a lower part of the airframe 301 in a normal posture.

In this configuration, the flying object igniter is operated in response to an operation signal transmitted from a control unit mounted on the flying object (a computer having a CPU, a ROM, a RAM, and the like) to operate the flying object igniter when (1) an abnormality detection unit (not shown) such as an acceleration sensor detects a predetermined acceleration or higher (for example, a preset acceleration at which falling is assumed), or when (2) a reception unit mounted on the flying object is in a state unable to receive a control signal from a transmission unit of a control device for a predetermined time or longer, for example. The airbag 311 is inflated by gas pressure thus generated. In this manner, obstacles and loads, especially pedestrians can be protected at the time of falling.

Figure 7:
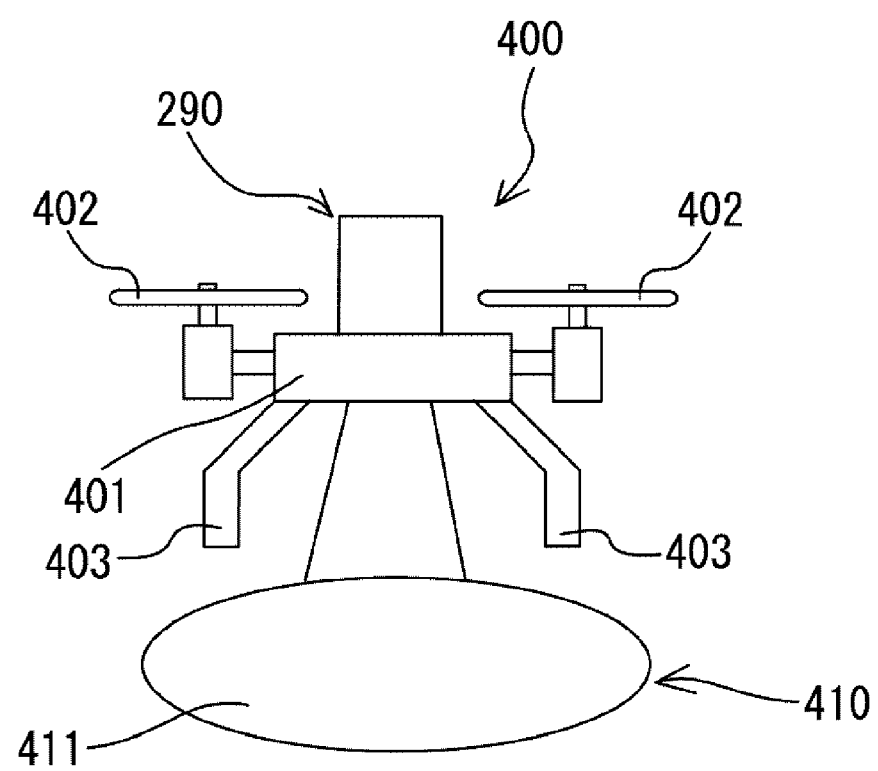
FIG. 7 is a diagram showing another example of the flying object including the airbag device to which the flying object igniter is applied.

In addition, as shown in FIG. 7, an airbag device 410 of the flying object 400 may be provided on an airframe 401 facing a parachute or paraglider deploying device 290 provided on an upper part of the airframe 401 in a normal posture. Note that the flying object 400 includes a device (not shown) provided on a lower part of the airframe 401 in a normal posture.

In this configuration, pedestrians and obstacles, especially the above-described device of the flying object 400 can be protected when the airbag 411 is inflated by the airbag device 410 described above at the time of falling.

While not shown in FIGS. 6 and 7, a component detection unit which detects the presence or absence and abnormality of the airbags 311 and 411, and a notification unit which notifies the administrator or the like of the absence or abnormality of the airbags 311 and 411 when the absence or abnormality of the airbags 311 and 411 is detected by the component detection unit may be further provided similarly to the configuration of FIG. 4 described above.

As described above, the airbag devices 310 and 410 each include the flying object igniter of the present embodiment. In this case, the operation of the ignition unit 11 can be guaranteed, and malfunction of the ignition unit 11 can be prevented similarly to the above. Accordingly, reliability of the airbag devices 310 and 410 in terms of safety can improve.

In addition, when the component detection unit detects an abnormality or the like of the airbag device 310 or 410, the notification unit notifies the administrator or the like that the abnormality or the like has been detected. Accordingly, the administrator or the like can easily and immediately recognize the abnormality.

While the embodiment of the present invention has been described with reference to the drawings, it should be understood that specific configurations are not limited to those described in the embodiment. The scope of the present invention is defined not by the description of the embodiment but by the claims, and includes all modifications within the meaning and scope equivalent to those of the claims.

The attachment positions of the above-described airbag devices 310 and 410, which are shown in FIGS. 6 and 7 and configured to protect persons and objects, are not limited to the positions shown in FIGS. 6 and 7. The positions of the airbag devices 310 and 410 on the surface of the airframe may be any positions as long as the airbags 311 and 411 can be deployed and inflated to protect persons and objects.

Moreover, while the flying object igniter 84 has been described in the above embodiment as an example of the flying object operating device, the present invention is not limited to this example. A following example may be adopted as another example of the flying object operating device. Note that parts in FIG. 8 referred to below and given last two digits identical to corresponding digits in FIG. 4 are similar to the corresponding parts described in FIG. 4 unless specified otherwise. Accordingly, description of these parts is not repeated.

Figure 8:
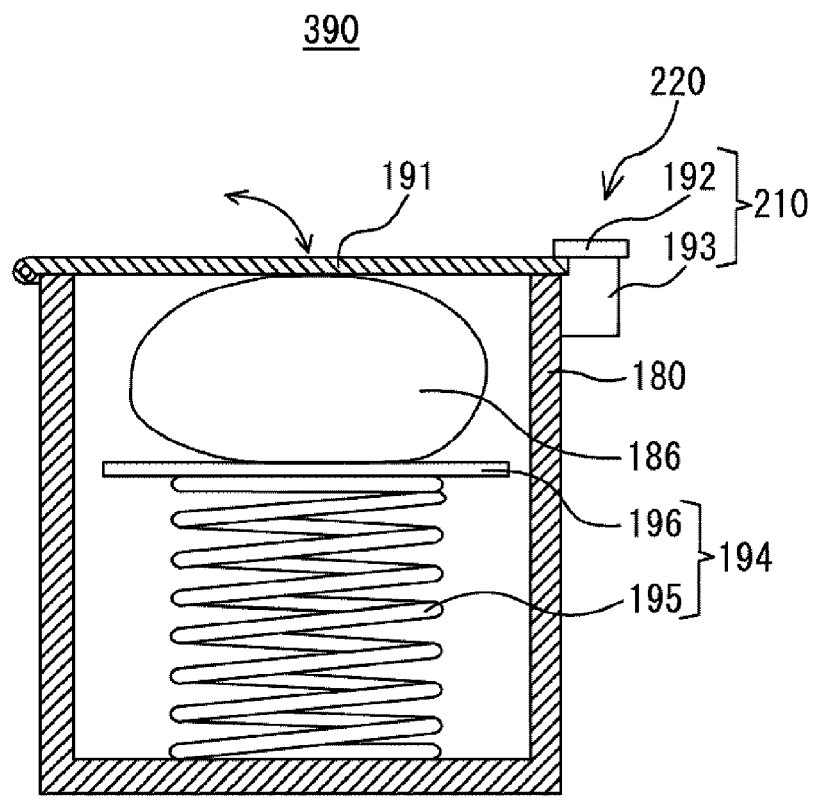
FIG. 8 is a cross-sectional view showing another example of the parachute or paraglider deploying device including a flying object operating device.

As shown in FIG. 8, a parachute or paraglider deploying device 390 includes a flying object operating device 220, and a pushing portion 194 which is provided inside a housing 180 having a bottomed cylindrical shape, and includes a support plate 196 for supporting a parachute or paraglider 186, and a spring 195 having one end connected to a lower surface of the support plate 196.

An openable cover 191 which can be opened is provided at an open end of the housing 180. A part of the parachute or paraglider 186 is in contact with a lower surface of the openable cover 191, and the other part is supported by the support plate 196 and housed in the housing 180 while urged upward by the spring 195. In addition, the openable cover 191 in an initial state is closed by a lever portion (locking unit) 192 of an operating unit 210 by being locked. A lower surface of the lever portion 192 is connected to one end of a rotation shaft (not shown, and corresponding to a rotating shaft extending in a substantially vertical direction (the up-down direction in the sheet surface of FIG. 8)) of a driving unit 193 constituted by a motor, for example, and is configured to be rotatable around the rotation shaft. In addition, the flying object operating device 220 includes an abnormality detection unit (not shown) which detects an operating state of the operating unit 210, a flight state detection unit (not shown) which is similar to the flight state detection unit 22 of FIG. 2 and detects a flight state of the flying object, an energizing circuit (not shown) which has an energizing circuit switch for operating the operating unit 210, and a calculation unit (not shown) which compares a detection result obtained by the abnormality detection unit and a detection result obtained by the flight state detection unit with respective thresholds set beforehand, and turns on the energizing circuit switch in accordance with a comparison result.

Note that the abnormality detection unit which detects the operating state of the operating unit 210 detects an operating state of the driving unit 193. In other words, the abnormality detection unit detects whether or not the driving unit 193 is operable. Specifically, in the present example, the abnormality detection unit detects an abnormality of the driving unit 193 based on an electric circuit resistance value. The electric circuit resistance value is determined by a structure of an electric circuit (a circuit length, a material constituting the circuit, a thickness of the circuit, and the like). A range of the resistance value when the electric circuit normally functions is determined in correspondence with this structure. The abnormality detection unit determines that the operating state of the driving unit 193 is abnormal when the electric circuit resistance value of the driving unit 193 is out of the resistance value range. For example, a state where the electric circuit resistance value is Go indicates that the electric circuit of the driving unit 193 is disconnected. In addition, the pushing portion 194 and the parachute or paraglider 186 constitute a moving unit capable of moving (opening) the openable cover 191 from the opening of the housing 180 when the locking by the lever portion 192 is released.

In this configuration, the lever portion 192 is rotated to a predetermined position by the driving of the driving unit 193 when an abnormality is detected by an abnormality detection unit such as an acceleration sensor. In accordance with this rotation, the locking (hooking) of the openable cover 191 by the lever portion 192 is released, and the openable cover 191 is opened. As a result, the spring 195 of the pushing portion 194 extends, and the parachute or paraglider 186 is pushed out by an extension force thus generated. Consequently, the openable cover 191 is opened, and the parachute or paraglider 186 ejected to the outside is deployed.

Similarly to the case described in the above embodiment, the flying object operating device 220 according to the mode of FIG. 8 is also configured to prevent activation of a system of the safety device without checking whether or not the operating unit 210 is operable, and turn on the energizing circuit switch when the flying object is determined to be in the flying state with the operation of the operating unit 210 guaranteed. Accordingly, malfunction of the operating unit 210 can be prevented. In this manner, reliability in terms of safety can improve.

While the spring 195 is used in the present example, the present invention is not limited to this example. Propelling force (generated by gas pressure, wind pressure, or the like) other than urging force may be employed as well as elastic bodies such as rubber to push out (eject) the parachute or paraglider 186 to the outside of the housing and open the cover.

Moreover, while the actual measurement data obtained by the acceleration sensor is read at the time of detection of the flight state of the flying object in the above embodiment, the present invention is not limited to this example. Instead of the acceleration sensor, other sensors such as a gyro sensor, a pressure sensor, a laser sensor, and an ultrasonic sensor, or wireless communication using signals from GNSS (Global Navigation Satellite System) or a drone or signals from an operator may be adopted.

Furthermore, while the ignition abnormality detection unit 21, the flight state detection unit 22, the calculation unit 23, and the diagnosis unit 24 are functionally implemented by software in the above embodiment, the present invention is not limited to this example. These units may be constituted by hardware.

In addition, while the pushing portion uses a spring in the above-described modification, the present invention is not limited to this example. Any types such as rubber and other elastic bodies may be adopted instead of the spring as long as an urging force can be generated.

Figure 9:
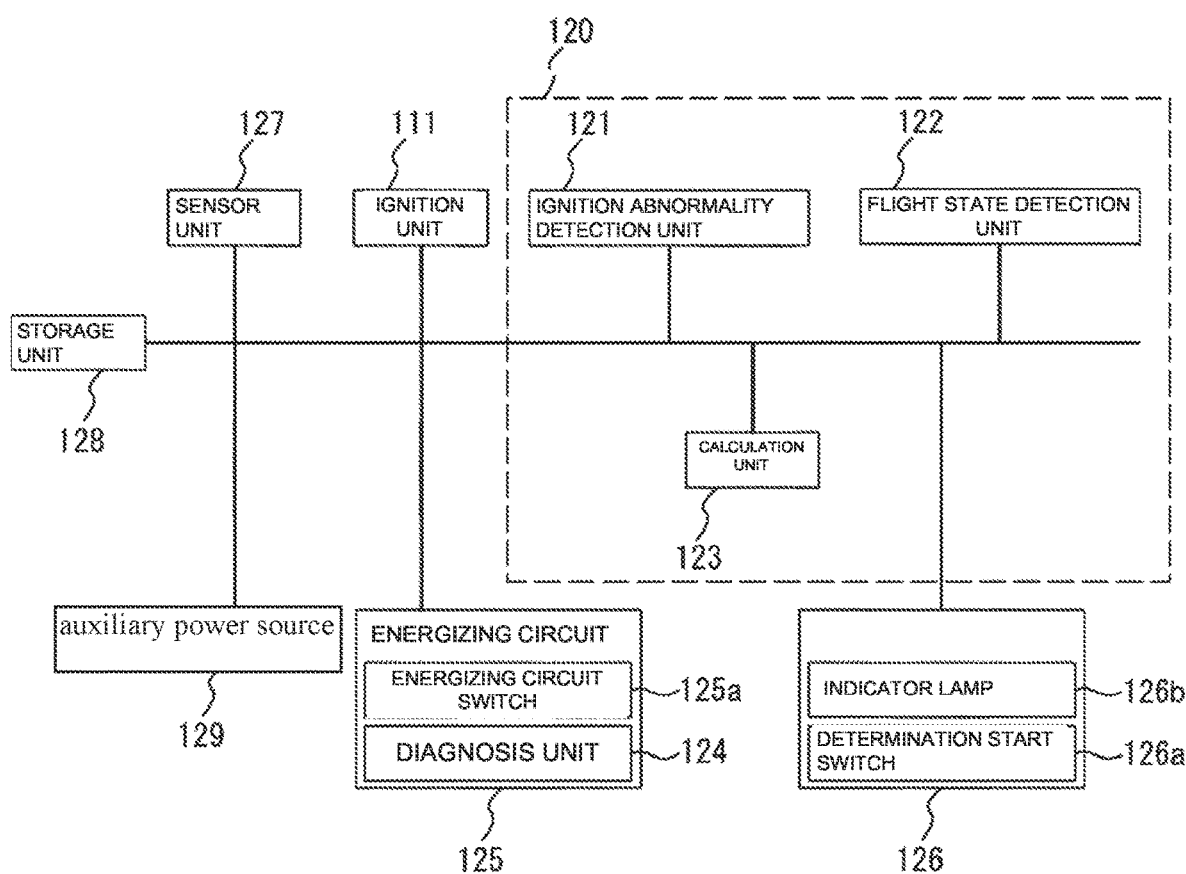
FIG. 9 is a block diagram showing a functional configuration of a flying object igniter according to a modification.

Moreover, according to the present invention, the flying object igniter may have a functional configuration shown in FIG. 9 instead of the functional configuration shown in FIG. 2. More specifically, the flying object igniter of the present modification includes a diagnosis unit 124 in an energizing circuit 125 instead of the diagnosis unit 24 in the control unit 120 of the above embodiment, and further includes a user interface 126. In addition, the flying object igniter of the present modification includes a sensor unit 127 containing various sensors such as an acceleration sensor and an altitude sensor, a storage unit 128 capable of storing data obtained by the sensor unit 127, and various data such as data obtained when an abnormality is detected, and an auxiliary power source 129 constituting an auxiliary power source for a power source of a flying object body.

The user interface 126 includes a determination start switch 126a operated by a user when determining beforehand whether or not an ignition abnormality is present before starting an operation, and an indicator lamp 126b indicating a determination result of the determination start switch 126a. The indicator lamp 126b is a lighting device such as an LED, and lights in yellow during determination, in blue when an abnormality is absent (indication of safety), and in red when an abnormality is present (indication of error). Note that the operation of the flying object is disabled until cancellation of an abnormality when the abnormality is present before the operation of the flying object.

An example of an operation of the flying object igniter having the functional configuration shown in FIG. 9 will be described herein with reference to flowcharts of FIGS. 10 to 14.

Figure 10:
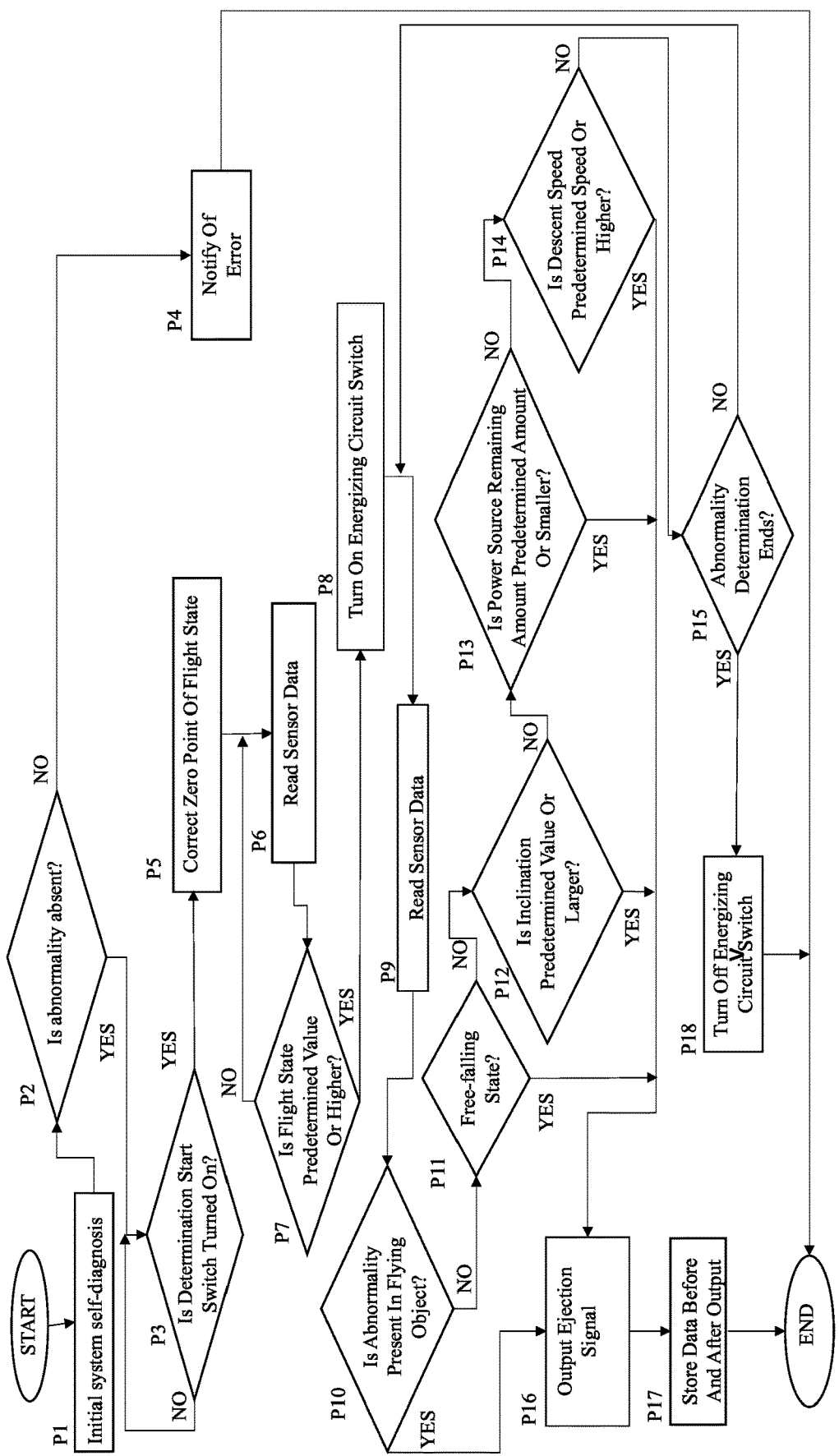
FIG. 10 is an example of a flowchart showing an operation of a flying object igniter according to a modification.

<Operation Based on Flowchart of FIG. 10>

As shown in FIG. 10, system self-diagnosis is initially performed by the CPU of the flying object igniter having the functional configuration shown in FIG. 9 (step S1). Performed in this case are diagnosis of whether an abnormality is absent in the circuit, diagnosis of whether a normal operation is achievable using an acceleration sensor measuring an acceleration of the flying object or the like, and diagnosis of whether an ignition unit 111 is operable, for example.

When the absence of abnormality is determined as a result of step P1 (YES in step P2), the flight state detection unit 122 determines whether or not the determination start switch is in the ON state (whether or not the administrator or the like has operated the determination start switch 126a) (step P3). On the other hand, when the absence of abnormality is not determined as a result of step P1 (NO in step P2), the diagnosis unit 124 transmits an error signal to the user interface 126 to notify the administrator or the like of an error, and causes the indicator lamp 126b to light in red (step P4). Thereafter, the process ends.

When the determination start switch is in the ON state (YES in step P3), the flight state detection unit 122 performs zero point correction for altitude information associated with the flying object, and information indicating the flight state of the flying object, such as a descent speed and a propeller rotation speed of a propelling mechanism (for example, resetting the condition that the flying object is in contact with the ground surface (at altitude 0) at the current altitude, or resetting the above-described propeller speed and descent speed to 0) (step P5). At this time, the ignition abnormality detection unit 121 may transmit a safety signal to the user interface 126 and cause the indicator lamp 126b to light in blue to notify the administrator or the like that there has been no abnormality.

Subsequently, the flight state detection unit 122 reads actual measurement data, such as data obtained by the acceleration sensor, from the sensor unit 127 (step P6), and then determines whether or not the flight state of the flying object is equal to or higher than a predetermined condition (step P7). For example, when the flight state meets all of following conditions: a certain altitude (for example, 1 m) or higher of the flying object, a certain speed (for example, 1000 rpm) or higher of the propeller speed of the propelling mechanism, and a certain speed (for example, 5 m/s) or lower of the descent speed of the flying object (YES in step P7), the calculation unit 123 turns on the energizing circuit switch 125a (step P8). On the other hand, when the flying object is not in the flight state of the predetermined altitude or higher (NO in step P7), the flight state detection unit 122 returns to the processing of step P6. Note that the diagnosis unit 124 may notify the administrator or the like of an error when the flight state detection unit 122 detects an abnormality in the flight state of the flying object before returning to the processing of step P6.

After step P8, the flight state detection unit 122 again continues reading the measured data obtained by the acceleration sensor (step P9), and then determines whether or not an abnormality is present in the flying object (step P10). When an abnormality is absent in the flying object (NO in step P10), the flight state detection unit 122 determines whether the flying object is free-falling (step P11). When it is determined that the flying object is not free-falling (NO in step P11), the flight state detection unit 122 determines whether or not the inclination of the flying object is a predetermined value or larger (step P12). When the inclination of the flying object is not the predetermined value (for example, 25°) or larger (NO in step P12), the flight state detection unit 122 determines whether or not the remaining amount of the power source of the flying object is a predetermined value (for example, 5% of the total amount) or smaller (step P13). When the remaining power of the flying object is not the predetermined value or smaller (NO in step P13), the flight state detection unit 122 determines whether or not the descent speed of the flying object is a predetermined value (for example, 10 m/s) or higher (step P14). When the descent speed of the flying object is not the predetermined value or higher (NO in step P14), the flight state detection unit 122 determines whether or not a signal for ending the abnormality determination has been received (step P15). The signal for ending the abnormality determination herein is received when the signal is transmitted wirelessly from the administrator or the like, or transmitted based on self-determination by the CPU (for example, transmitted when the altitude of the flying object reaches 2 m or lower). The self-determination by the CPU detects that the current state is not the flight state by adopting other sensors such as an acceleration sensor, a gyro sensor, a pressure sensor, a laser sensor, and an ultrasonic sensor, or wireless communication using signals from GNSS or a drone or signals from an operator.

When the signal for ending the abnormality determination has not been received for a predetermined time or longer (NO in step P15), the process returns to step P9. On the other hand, when the signal for ending the abnormality determination is received within the predetermined time (YES in step P15), the calculation unit 123 turns off the energizing circuit switch 125a (step P18) to end the process. Note that the calculation unit 123 may turn off the energizing circuit switch 125a only when the flying object is at a predetermined altitude or lower in this step.

Note that the flight state detection unit 122 outputs and transmits an operation signal for operating the ignition unit 111 to eject the parachute or paraglider of the flying object operating device (step P16) when determining that an abnormality is present in the flying object (YES in step P10), determining that the flying object is free-falling (YES in step P11), determining that the inclination of the flying object is a predetermined value or larger (YES in step P12), when determining that the remaining amount of the power source is a predetermined value or smaller (YES in step P13), and when determining that the descent speed is a predetermined value or higher (YES in step P14). After outputting this operation signal, the flight state detection unit 122 stores data associated with the flying object before and after the output of the signal in the storage unit 128 (step P17). Thereafter, the present process ends.

Figure 11:
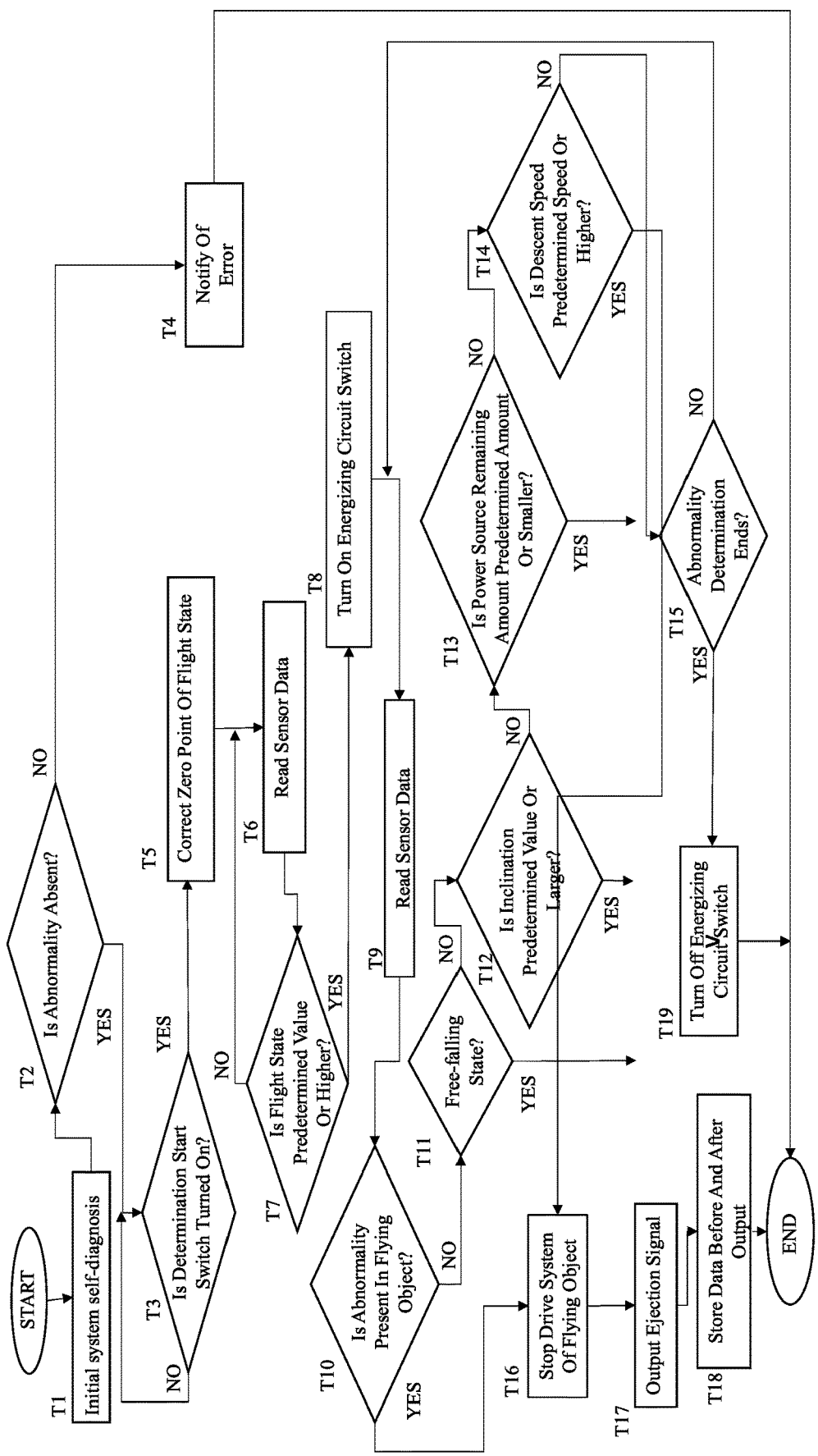
FIG. 11 is an example of a flowchart showing an operation of a flying object igniter according to a modification.

<Operation Based on Flowchart of FIG. 11>

A flowchart of FIG. 11 is different from the flowchart shown in FIG. 10 in that processing for stopping a drive system of the flying object (for example, a motor rotating a propeller which generates buoyancy) (step T16) is executed before outputting an ejection signal (step T17). Note that steps T1 to T15 and step T19 sequentially execute processing similar to the processing of steps P1 to P15 and step P18 in FIG. 10, and steps T17 and T18 execute processing similar to the processing of steps P16 and P17 in FIG. 10. Accordingly, description of these steps is not repeated.

Figure 12:
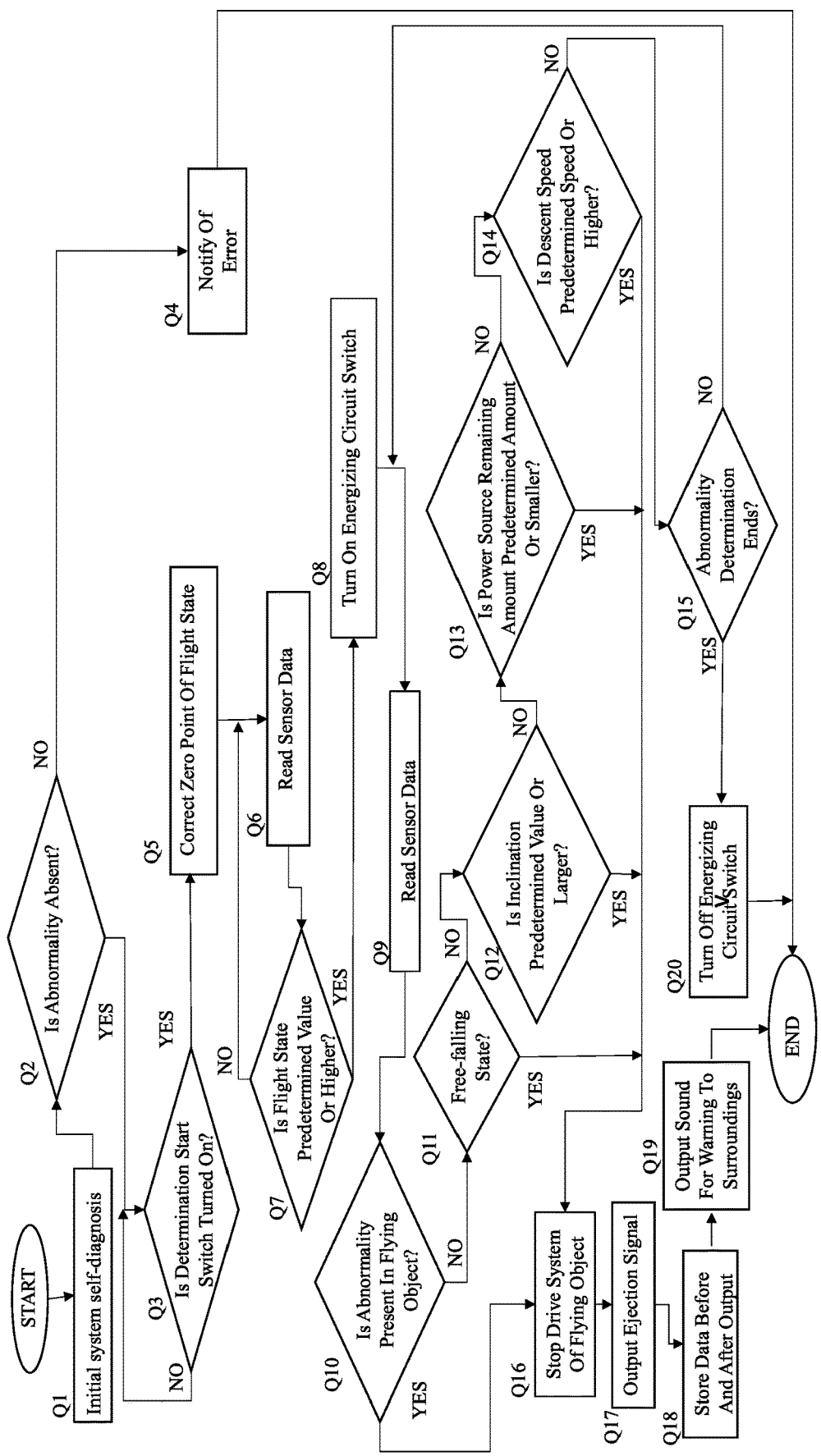
FIG. 12 is an example of a flowchart showing an operation of a flying object igniter according to a modification.

<Operation Based on Flowchart of FIG. 12>

Described with reference to a flowchart of FIG. 12 will be an operation of a flying object igniter having the functional configuration shown in FIG. 9, and further including an audio output unit (not shown). The flowchart of FIG. 12 is different from the flowchart shown in FIG. 11 in that processing for causing the above-described audio output unit to output a sound to generate a warning to surroundings is executed (step Q19) after data before and after the output of the sound is stored (step Q18). Note that steps Q1 to Q18 and step Q20 sequentially execute processing similar to the processing of steps T1 to T18 and step T19 in FIG. 11. Accordingly, description of these steps is not repeated. In a modification herein, an illumination output unit which generates a warning of light may be used instead of the audio output unit, or both the audio output unit and the illumination output unit may be used. The same applies to following modifications.

Figure 13:
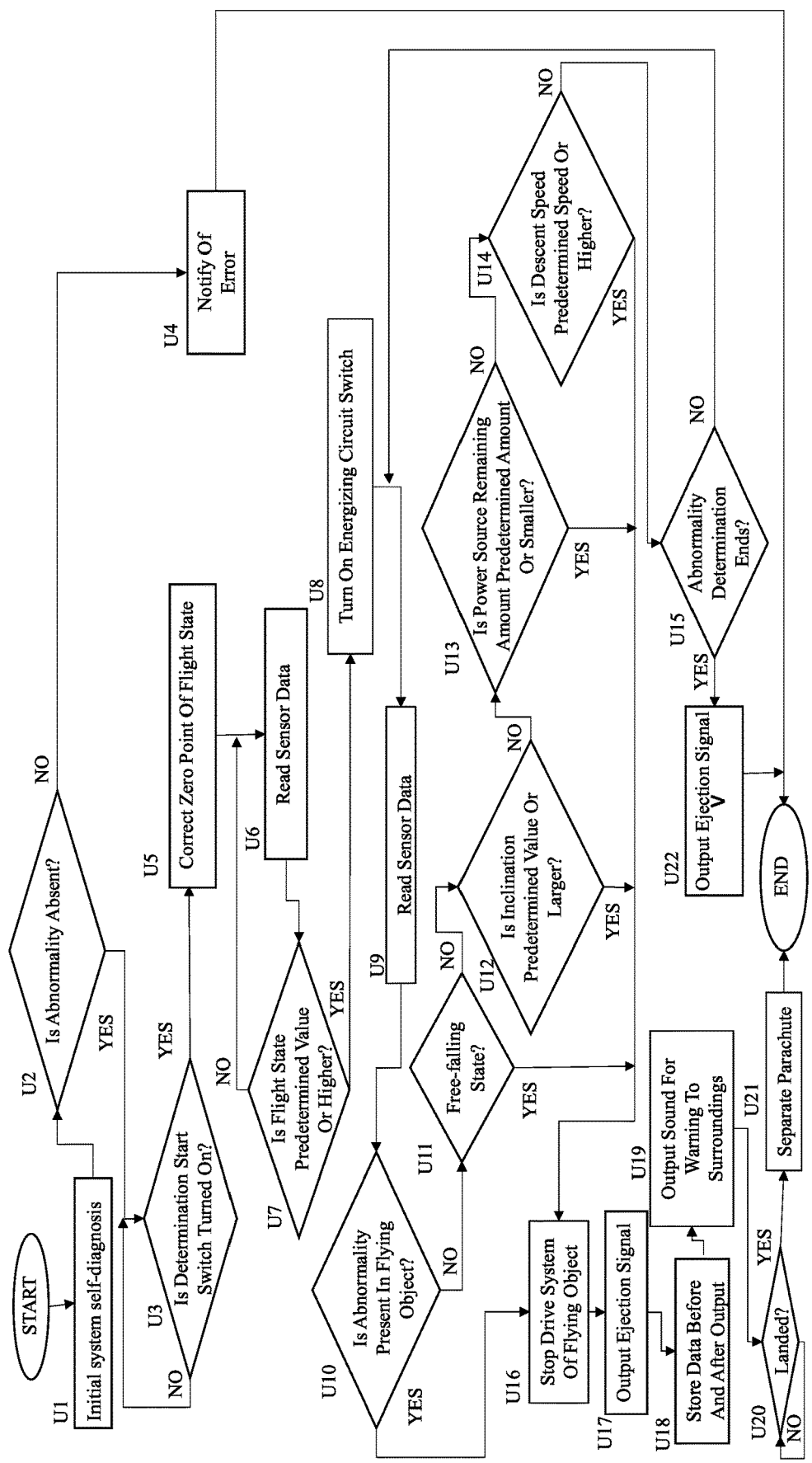
FIG. 13 is an example of a flowchart showing an operation of a flying object igniter according to a modification.

<Operation Based on Flowchart of FIG. 13>

Described with reference to a flowchart of FIG. 13 will be an operation of a flying object igniter having the functional configuration shown in FIG. 9, and further including the audio output unit (not shown). A flowchart of FIG. 13 is different from the flowchart shown in FIG. 12 in that processing for determining whether or not the flying object has landed (step U20), and processing for separating the parachute (step U21) are executed after processing for causing the audio output unit to output a sound generating a warning to surroundings is performed (step U19). Note that steps Q1 to Q19 and step U22 sequentially execute processing similar to the processing of steps Q1 to Q19 and step Q20 in FIG. 12. Accordingly, description of these steps is not repeated.

<Operation Based on Flowchart of FIG. 11>

A flowchart of FIG. 11 is different from the flowchart shown in FIG. 10 in that processing for stopping a drive system of the flying object (for example, a motor rotating a propeller which generates buoyancy) (step T16) is executed before outputting an ejection signal (step T17). Note that steps T1 to T15 and step T19 sequentially execute processing similar to the processing of steps P1 to P15 and step S18 in FIG. 10, and steps T17 and T18 execute processing similar to the processing of steps P16 and P17 in FIG. 10. Accordingly, description of these steps is not repeated.

<Operation Based on Flowchart of FIG. 12>

Described with reference to a flowchart of FIG. 12 will be an operation of a flying object igniter having the functional configuration shown in FIG. 9, and further including an audio output unit (not shown). The flowchart of FIG. 12 is different from the flowchart shown in FIG. 11 in that processing for causing the above-described audio output unit to output a sound to generate a warning to surroundings is executed (step Q19) after data before and after the output of the sound is stored (step Q18). Note that steps Q1 to Q18 and step Q20 sequentially execute processing similar to the processing of steps T1 to T18 and step T19 in FIG. 11. Accordingly, description of these steps is not repeated. In a modification herein, an illumination output unit which generates a warning of light may be used instead of the audio output unit, or both the audio output unit and the illumination output unit may be used. The same applies to following modifications.

<Operation Based on Flowchart of FIG. 13>

Described with reference to a flowchart of FIG. 13 will be an operation of a flying object igniter having the functional configuration shown in FIG. 9, and further including the audio output unit (not shown). A flowchart of FIG. 13 is different from the flowchart shown in FIG. 12 in that processing for determining whether or not the flying object has landed (step U20), and processing for separating the parachute (step U21) are executed after processing for causing the audio output unit to output a sound generating a warning to surroundings is performed (step U19). Note that steps U1 to U19 and step U22 sequentially execute processing similar to the processing of steps U1 to U19 and step Q20 in FIG. 12. Accordingly, description of these steps is not repeated.

In step U20, the flight state detection unit 122 executes processing for determining whether or not the flying object has landed based on altitude data and speed data detected by an altitude sensor, an acceleration sensor, and the like. When it is determined that the flying object has not landed (NO in step U20), step U20 is repeated. On the other hand, when it is determined that the flying object has landed (YES in step U20), the parachute or paraglider (deployed object) deployed while connected to the flying object by a string-shaped connecting member or the like is separated from the flying object (step U21).

Note that the separation of the parachute or paraglider from the flying object in step U21 is achieved by a cutting mechanism (not shown) which operates in accordance with a command signal from the flight state detection unit 122.

Figure 14:
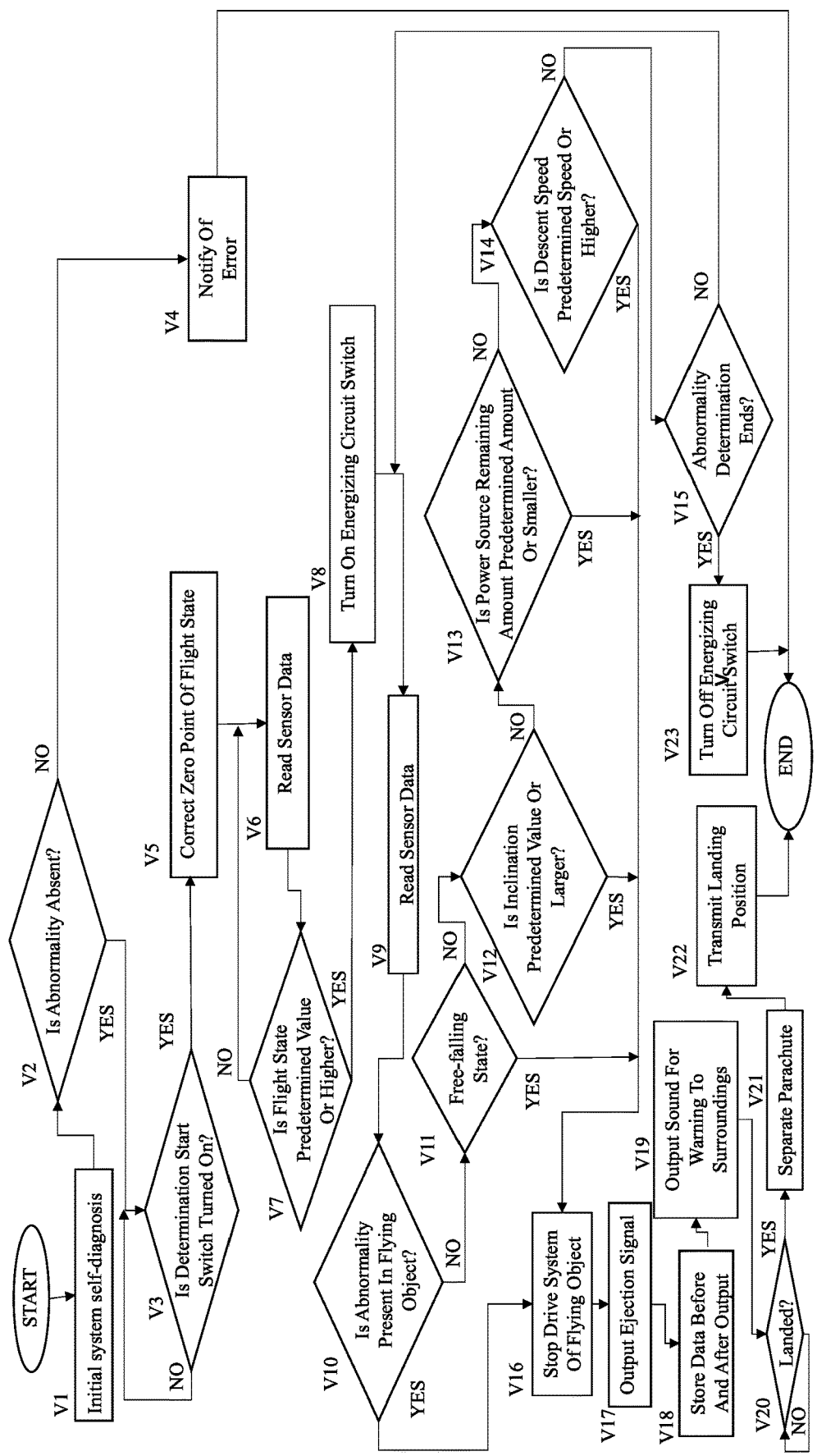
FIG. 14 is an example of a flowchart showing an operation of a flying object igniter according to a modification.

<Operation Based on Flowchart of FIG. 14>

Described with reference to a flowchart of FIG. 14 will be an operation of a flying object igniter having the functional configuration shown in FIG. 9, and further including an audio output unit (not shown) and a transmission device (not shown). The flowchart of FIG. 14 is different from the flowchart shown in FIG. 13 in that a landing position of the flying object is transmitted from the above-described transmission device to a reception device of the administrator or the like, a control tower, or others (step V22) after processing for separating the parachute or the paraglider is performed (step V21). Note that steps V1 to V21 and step V23 sequentially execute processing similar to the processing of steps U1 to U21 and step U22 of FIG. 13. Accordingly, description of these steps is not repeated.

The modifications described above also offer advantageous effects similar to those of the embodiment described above, and the operational effects described in the respective modifications.

REFERENCE SIGNS LIST 10 flying object igniter
11, 111 ignition unit (operating unit)
12, 13 terminal pin
20 control unit
21, 121 ignition abnormality detection unit (abnormality detection unit)
22, 122 flight state detection unit
23, 123 calculation unit
24, 124 diagnosis unit
25, 125 energizing circuit
25a, 125a energizing circuit switch
63 component detection unit
64 notification unit
80, 180 housing
81 piston
82 recess
83 piston head
84 flying object igniter (flying object operating device)
85 case
86, 186 parachute or paraglider
87 cover
88 actuator
90, 190, 290, 390 parachute or paraglider deploying device
100 flying object thrust generating device
101 housing
101a sealing cover
102 flange portion
103, 105 holder
104 fastening portion
106 gas generating agent storage chamber
107 gas generating agent
127 sensor unit
128 storage unit
129 auxiliary power source
191 openable cover
192 lever portion
193 driving unit
194 pushing portion
195 spring
196 support plate
200, 300, 400 flying object
201, 301, 401 airframe
202, 302, 402 propelling mechanism
203, 303, 403 leg
210 operating unit
220 flying object operating device
310, 410 airbag device
311, 411 airbag

The invention claimed is:

1. A flying object operating device for actuating a deploying device mounted on a flying object, the flying object operating device comprising:

an operating unit configured for actuating the deploying device;

an abnormality detection unit directly coupled to the operating unit and being configured to directly detect operability of the operating unit;

a flight state sensor configured to detect a flight state of the flying object;

an energizing circuit that includes an energizing circuit switch for operating the operating unit; and a controller configured to receive operability data from the abnormality detection unit before actuation of the deploying device by the operating unit, said controller is further configured to receive flight data from the flight state sensor;

wherein said controller is configured to compare said operability data and flight data with respective thresholds set beforehand, said controller is further configured to selectively turn on the energizing circuit switch based on the comparison result, such that the controller turns the energizing circuit switch on when detection result from the abnormality detection unit indicates that there is no malfunction in the operating unit before flight and/or during flight such that operation of the operating unit is guaranteed, and the detection result from the flight state sensor indicate that the flying object is in the flight state.

2. The flying object operating device according to claim 1, wherein the operating unit includes:
   a housing configured to hold the deploying device within the housing, said housing is provided with an opening having an openable cover, said opening is configured to allow ejection of the deploying device out of the housing;
   a locking unit configured to lock the openable cover;
   a driving unit configured to drive the locking unit to release the openable cover; and
   a moving unit configured to move the openable cover from the opening of the housing when the locking of the locking unit is released.

3. The flying object operating device according to claim 1, further comprising a notification unit configured to issue a notification when an abnormality has been detected at activation of the deploying device based on at least either the detection result obtained by the abnormality detection unit or the detection result obtained by the flight state sensor.

4. The flying object operating device according to claim 1, wherein the flight state sensor is configured to acquire information associated with the flight state from a control unit of the flying object.

5. A flying object thrust generating device connected to a flying object, the flying object thrust generating device comprising:
   a housing;
   a flying object operating device according to claim 1 and provided inside the housing or outside the housing; and
   a power source to which the flying object operating device is connected.

6. The flying object operating device according to claim 1, wherein the operating unit is an ignition unit including an explosive.

7. The flying object operating device according to claim 6, wherein the abnormality detection unit is a resistance detection device configured to supply to the ignition unit a current having a lower current value than a current value during operation of the ignition unit, said resistance detection device is further configured to detect a resistance value of the ignition unit.

8. A malfunction preventing method for a flying object operating device included in a deploying device mounted on a flying object, the flying object operating device including an operating unit used for operating the deploying device, the method comprising:
   a first detection step that detects an operating state of the operating unit;
   a second detection step that detects a flight state of the flying object;
   an activating step that activates the deploying device based on a detection result obtained by the first detection step and a detection result obtained by the second detection step; and
   a deactivating step that periodically recognizes the flight state, and deactivates the deploying device when the flying object is not in the flight state.

9. A malfunction preventing method for a flying object operating device included in a deploying device mounted on a flying object, the flying object operating device including an operating unit provided to operate the deploying device, the method comprising:
   a first detection step that detects an operating state of the operating unit;
   a second detection step that detects a flight state of the flying object;
   an energizing step that turns on an energizing circuit switch connected to the operating unit based on a detection result obtained by the first detection step and a detection result obtained by the second detection step; and
   a non-energizing step that periodically recognizes the flight state, and turns off the energizing circuit switch when the flying object is not in the flight state.

10. A flying object thrust generating device connected to a flying object, the flying object thrust generating device comprising:
    a housing;
    a flying object operating device and provided inside the housing, said flying object operating device including:
       a) an operating unit configured for actuating the deploying device, said operating unit is an ignition unit including an explosive;
       b) an abnormality detection unit configured to detect operability of the operating unit;
       c) a flight state sensor configured to detect a flight state of the flying object;
       d) an energizing circuit that includes an energizing circuit switch for operating the operating unit; and
       e) a controller configured to compare a detection result obtained by the abnormality detection unit and a detection result obtained by the flight state sensor with respective thresholds set beforehand, said controller is further configured to selectively turn on the energizing circuit switch based on the comparison result, such that the controller turns the energizing circuit switch on when detection result from the abnormality detection unit indicates that there is no malfunction in the operating unit before flight and/or during flight such that operation of the operating unit is guaranteed, and the detection result from the flight state sensor indicate that the flying object is in the flight state;
    a power source to which the flying object operating device is connected; and
    a propellant that is at least one of propellants selected from an explosive, a gas generating agent, a flammable liquid, and a flammable solid, and is provided inside the housing.

11. The flying object thrust generating device according to claim 10, wherein the ignition unit is disposed on a bottom side of the housing; and a sealing cover that is disposed on a side opposite to a position of the ignition unit, and closes an opening of the housing, is further provided.

12. A parachute or paraglider deploying device comprising:

a flying object operating device including:
  a) an operating unit configured for actuating the deploying device;
  b) an abnormality detection unit configured to detect operability of the operating unit;
  c) a flight state sensor configured to detect a flight state of the flying object;
  d) an energizing circuit that includes an energizing circuit switch for operating the operating unit; and
  e) a controller configured to compare a detection result obtained by the abnormality detection unit and a detection result obtained by the flight state sensor with respective thresholds set beforehand, said controller is further configured to selectively turn on the energizing circuit switch based on the comparison result, such that the controller turns the energizing circuit switch on when detection result from the abnormality detection unit indicates that there is no malfunction in the operating unit before flight and/or during flight such that operation of the operating unit is guaranteed, and the detection result from the flight state sensor indicate that the flying object is in the flight state;
a parachute or a paraglider that is deployable,
wherein the operating unit is configured to deploy the parachute or the paraglider when an abnormality is detected by the abnormality detection unit; and
a component detection unit configured to detect a presence or absence or an abnormality of the parachute or the paraglider; and a notification unit configured to issue a notification indicating the absence or the abnormality of the parachute or the paraglider when the component detection unit detects the absence or the abnormality of the parachute or the paraglider.

13. An airbag device comprising:
an airbag that is inflatable;
a flying object operating device including:
  f) an operating unit configured for actuating the deploying device, said operating unit is an ignition unit including an explosive;
  g) an abnormality detection unit configured to detect operability of the operating unit;
  h) a flight state sensor configured to detect a flight state of the flying object;
  i) an energizing circuit that includes an energizing circuit switch for operating the operating unit; and
  j) a controller configured to compare a detection result obtained by the abnormality detection unit and a detection result obtained by the flight state sensor with respective thresholds set beforehand, said controller is further configured to selectively turn on the energizing circuit switch based on the comparison result, such that the controller turns the energizing circuit switch on when detection result from the abnormality detection unit indicates that there is no malfunction in the operating unit before flight and/or during flight such that operation of the operating unit is guaranteed, and the detection result from the flight state sensor indicate that the flying object is in the flight state;
a gas generator that generates gas for inflating the airbag by an ignition operation performed by the flying object operating device; and
wherein the airbag is inflated by the gas generated by the gas generator with activation of the operating unit of the flying object operating device at the time of detection of the abnormality by the abnormality detection unit.

14. The airbag device according to claim 13, further comprising:
a component detection unit configured to detect a presence or absence or an abnormality of the airbag; and
a notification unit configured to issue a notification indicating the absence or the abnormality of the airbag when the component detection unit detects the absence or the abnormality of the airbag.

* * * * *